United States Patent
Calvo et al.

(10) Patent No.: US 7,058,671 B2
(45) Date of Patent: Jun. 6, 2006

(54) SYSTEM COMBINING INFORMATION WITH VIEW TEMPLATES GENERATED BY COMPILER IN A SERVER FOR GENERATING VIEW STRUCTURE FOR CLIENT COMPUTER

(75) Inventors: Matias Garcia Calvo, Madrid (ES); Antonio E. Martinez Martinez, Madrid (ES); Concha Tourne Izquierdo, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 09/951,201

(22) Filed: Sep. 13, 2001

(65) Prior Publication Data

US 2003/0051001 A1    Mar. 13, 2003

(51) Int. Cl.
*G06F 17/24*    (2006.01)
(52) U.S. Cl. .................... 707/908; 707/501.1; 707/513
(58) Field of Classification Search ................ 709/218, 709/202, 203; 705/1; 707/200, 513, 203; 717/108; 715/908, 501.1, 513
See application file for complete search history.

(56) References Cited

U.S. PATENT DOCUMENTS

| 5,835,712 A * | 11/1998 | DuFresne ................ 709/203 |
| 5,894,554 A * | 4/1999 | Lowery et al. ........... 709/203 |
| 6,055,570 A | 4/2000 | Nielsen |
| 6,275,830 B1 * | 8/2001 | Muthukkaruppan et al. ..... 707/200 |
| 6,826,744 B1 * | 11/2004 | McAuley ................ 717/108 |
| 2001/0032253 A1 * | 10/2001 | Duxbury ................ 709/218 |
| 2002/0059327 A1 * | 5/2002 | Starkey ................. 707/203 |
| 2002/0138289 A1 * | 9/2002 | Thielges et al. ........... 705/1 |
| 2002/0188631 A1 * | 12/2002 | Tiemann et al. .......... 707/513 |

FOREIGN PATENT DOCUMENTS

| EP | 0889421 | 1/1999 |
| GB | 2300991 | 11/1996 |
| WO | WO 98/14896 | 4/1998 |
| WO | WO 01/57651 | 8/2001 |

OTHER PUBLICATIONS

Mateos, M. "Method and System for Delivering Dynamic Information in a Network" IBM Pat nt Application, Filed Sep. 13, 2001, Serial Number not Available.

* cited by examiner

*Primary Examiner*—Le H. Luu
(74) *Attorney, Agent, or Firm*—John R. Pivnichny; Greenblum & Bernstein, P.L.C.

(57) ABSTRACT

A method and system for delivering dynamic web pages in the INTERNET. Compiled programs embedding static queries to a database are stored on a server computer; view templates with HTML tags defining the layout of corresponding dynamic web pages and data tags instructing where and how to include each record of the query result into the respective dynamic web page are further stored on the server computer. When a dynamic web page must be distributed, the corresponding program is run, and the query result is stored into a shared memory structure. The query result is combined with the corresponding view template, by replacing the data tags with the associated records in the shared memory structure. The resulting web page is then distributed to client computers of the network.

12 Claims, 3 Drawing Sheets

SYSTEM COMBINING INFORMATION WITH VIEW TEMPLATES GENERATED BY COMPILER IN A SERVER FOR GENERATING VIEW STRUCTURE FOR CLIENT COMPUTER

FIELD OF THE INVENTION

The present invention relates to a method and system for delivering dynamic information in a network.

BACKGROUND OF THE INVENTION

Networks of computers are commonly used to implement distributed data processing systems. In particular, the INTERNET has attained a widespread diffusion in the last years. The INTERNET is a network of networks connecting millions of computers with a decentralized design. The INTERNET has a client/server architecture, wherein server computers of the network support shared resources; client computers access the shared resources through the network.

The INTERNET also allows each client computer to interact dynamically with a server computer, in order to download and display information whose content changes each time it is provided by the server computer. This function is typically used for handling generation and distribution of reports resulting from queries on a database of the server computer.

A solution known in the art for delivering dynamic information in the INTERNET consists in defining the reports by means of corresponding programs, for example conforming to the ActiveX scripting (ASP) specification. Whenever a request for dynamic information is received from a client computer of the network, the server computer invokes execution of the corresponding ASP program. The ASP program generates the report by running dynamic queries on the database of the server computer.

A drawback of the solution described above is that the programs generating the reports are quite complex; moreover, the dynamic queries run by these programs are relatively slow. As a consequence, the performance of the server computer is severely affected.

The above-mentioned drawback is particularly acute in a high-availability server computer, which is required to distribute complex reports at very high rate. In this case, the throughput of the server computer may be inadequate to meet the requested distribution rate. The solutions known in the art then result in slowing down the operation of the whole network.

SUMMARY OF THE INVENTION

It is an object of the present invention to improve the performance of the network.

It is another object of the present invention to increase the throughput of the server computer.

It is yet another object of the present invention to allow the server computer to distribute dynamic information at high rate.

The accomplishment of these and other related objects is achieved by a method of delivering dynamic information in a network including the steps under the control of a server computer of the network of: storing a plurality of view templates, each one for a block of information, and a plurality of sets of at least one program, each set being for fetching a block of information; retrieving the view template corresponding to a selected block of information; fetching the selected block of information by running the corresponding set of at least one program; generating a view structure by combining the selected block of information with the corresponding view template; and sending the view structure to at least one client computer of the network for causing the view structure to be displayed on the at least one client computer.

The present invention also provides a computer program application directly loadable into a working memory of a server computer of a network for performing a method of delivering dynamic information in the network when the application is run on the server computer, the server computer storing a plurality of view templates, each one for a block of information, and a plurality of sets of at least one program, each set being for fetching a block of information, wherein the method includes the steps of: retrieving the view template corresponding to a selected block of information; fetching the selected block of information by running the corresponding set of at least one program; generating a view structure by combining the selected block of information with the corresponding view template; and sending the view structure to at least one client computer of the network for causing the view structure to be displayed on the at least one client computer.

Furthermore, the present invention provides a corresponding system for delivering dynamic information in a network.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
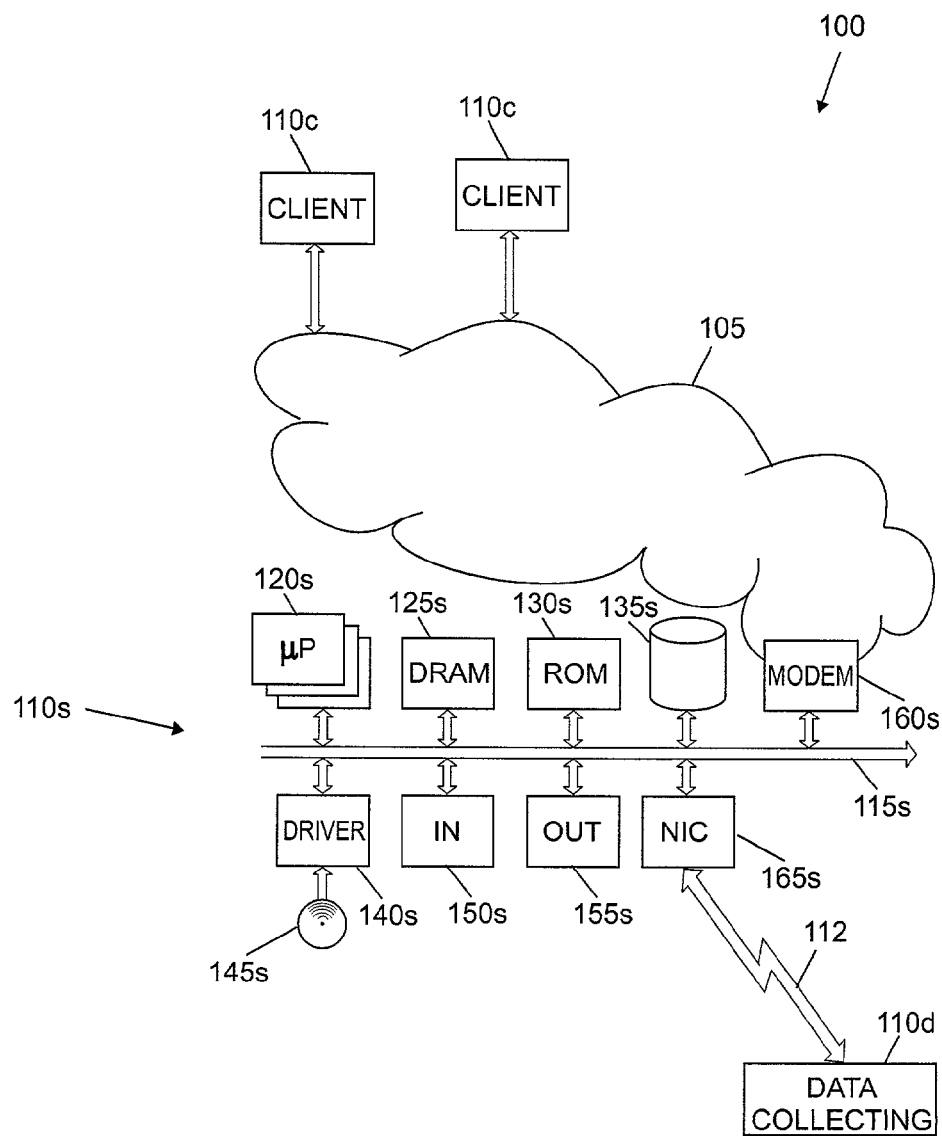
FIG. 1 is a schematic representation of a data processing system in which the method of the invention can be used.

With reference in particular to FIG. 1, there is shown a data processing system 100. The system 100 includes a network 105, which may be in particular the INTERNET. The INTERNET 105 is formed by millions of computers, which are connected to each other through a telecommunication structure. Client computers 110c access the INTERNET 105 through an Internet Service Provider, or ISP (not shown in the figure). Access to the INTERNET 105 allows users of the client computers 110c to exchange information, send and receive e-mails, and view documents. Particularly, a system of server computers 110s (the World Wide Web) manages hypertext documents, known as web pages. Each web page is formatted in HTML, a language that supports links to other documents, as well as graphics, audio, and video files. The web uses the HTTP protocol, which defines how messages are formatted and transmitted, and what actions the client computers 110c and the server computers 110s should take in response to various commands. A generic server computer 110s of the INTERNET 105 is coupled to one or more data-collecting computers 110d through a Local Area Network (LAN) 112.

Each server computer 110s, for example consisting of a mini-computer, is formed by several units that are connected in parallel to a communication bus 115. In detail, multiple microprocessors (µP) 120 control operation of the server computer 110s. A working memory 125, typically a DRAM (Dynamic Random Access Memory), is directly used by the microprocessors 120, and a Read Only Memory (ROM) 130 stores a basic program for the bootstrap of the server computer 110s. Several peripheral units are further connected to the bus 115 (by means of respective interfaces). Particularly, a bulk memory, which may be a magnetic hard-disk 135, and a driver 140 for reading CD-ROMs 145. Moreover, the server computer 110s includes an input unit (IN) 150 (for example consisting of a keyboard and a mouse), and an output unit (OUT) 155 (for example consisting of a monitor and a printer). A MODEM 160 is used to couple the server computer 110s to the INTERNET 105, while a Network Interface Card (NIC) 165 is used to plug the server computer 110s into the LAN 112.

Similar considerations apply if a different network is envisaged (such as an INTRANET), if the server computer has a different structure or includes different units (such as a web cam), if the server computer is coupled to the data-collecting computer in a different manner (for example through a point-to-point connection), if the server computer and the data-collecting computer consist of distinct logic partitions of a single system, and so on.

Figure 2:
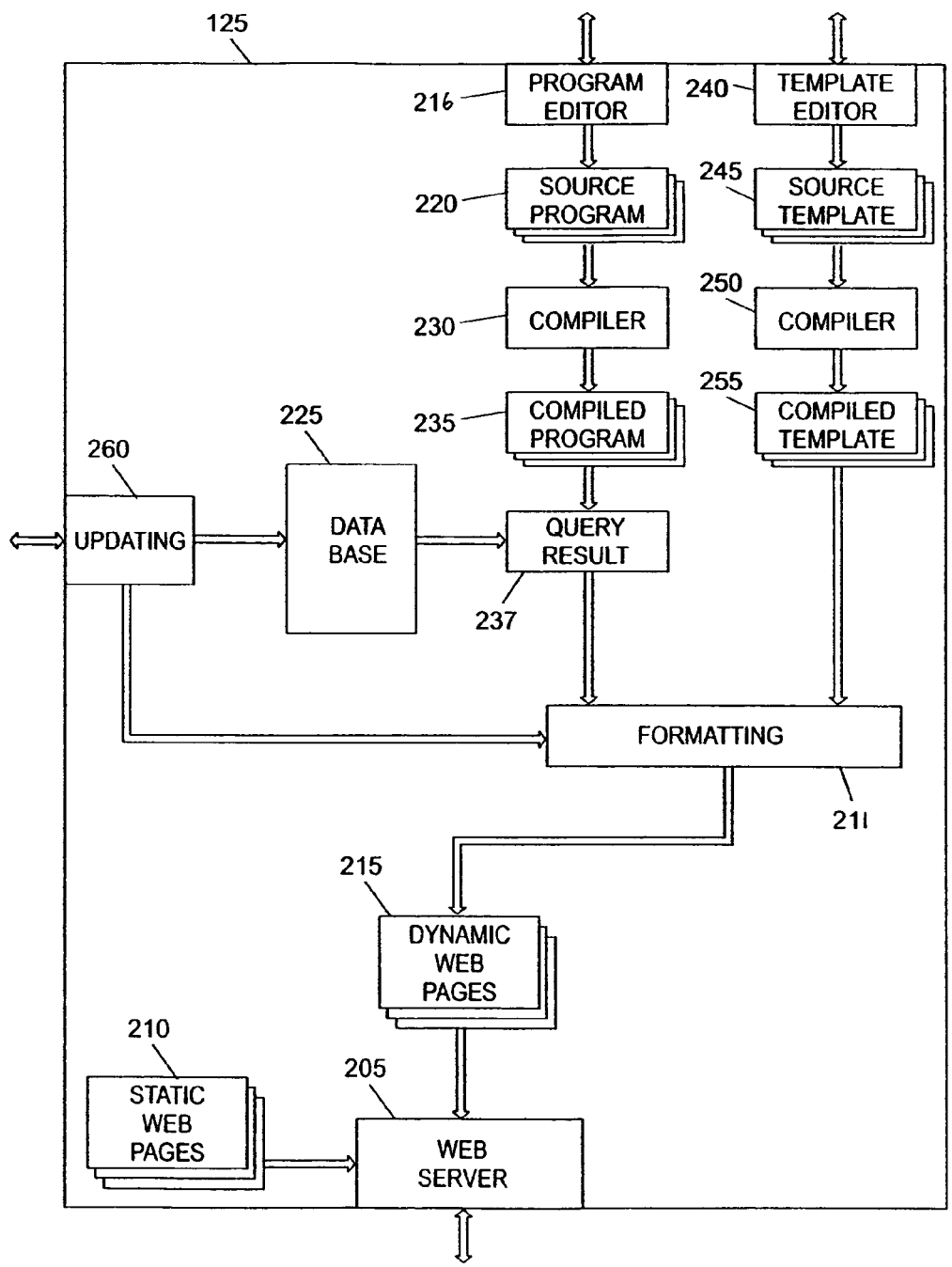
FIG. 2 depicts a partial content of a working memory of a server computer of the system.

Considering now FIG. 2, there is shown a partial content of the working memory 125 of the server computer in operation; the information (programs and data) is typically stored on the hard-disk and loaded (at least partially) into the working memory when the programs are running, together with an operating system and other application programs (not shown in the figure). The programs are initially installed onto the hard disk from CD-ROM.

The working memory 125 includes a web server module 205, which executes commands submitted by each client computer and delivers corresponding web pages. The web server module 205 accesses a repository 210 of static web pages. Each static web page consists of an HTML document that is fetched by the web server module 205 on request. The web server module 205 directly interfaces with a formatting module 211, which generates dynamic web pages. The dynamic web pages are stored into an output buffer 215 that operates as a cache memory for the web server 205.

A program editor 216 is used to input, update, view and perform other management functions on a repository of programs 220 in source code (for example written in the C language). Each source program 220 embeds one or more queries (for example in the SQL language), which are designed to be run on a database 225 of the server computer. The source programs 220 are input to a compiler 230; the compiler 230 generates corresponding programs 235 in object code that are linked and bound to an access plan to the database 225. The result of the queries embedded in the compiled programs 235 consists of blocks of information formed by series of records (or fields), which are stored into a shared memory structure 237 accessed by the formatting module 211.

A template editor 240 is likewise used to manage a further repository of (source code) view templates 245 for the query results. Particularly, each source template 245 includes an HTML document with a series of markup tags defining the layout of a dynamic web page including the respective query result. The source template 245 further includes non-HTML tags (data tags), which instruct where and how to include each record of the query result into the dynamic web page; furthermore, one or more specific non-HTML tags (program tags) are used to specify the name of a set of compiled programs 235 embedding the queries associated with the dynamic web page. Therefore, each source template 245 is a flat text file that defines a pattern model for displaying the query result on the client computers.

The source templates 245 are input to a further compiler 250. The compiler 230 generates corresponding view templates 255, wherein the non-HTML tags are transformed into instructions in object code. Each complied template 255 is then a program directly executable by the formatting module 210. The instructions of the compiled template 255 cause the data tags to be replaced with the corresponding records stored in the shared memory structure 237. This results in generation of the corresponding dynamic web page, which is obtained by combining the query result stored in the shared memory structure 237 with the layout defined by the markup tags of the source template 255. Building of the dynamic web page is then split into two distinct and consecutive steps. In a first step, the dynamic information is fetched from the database and stored into the shared memory structure. In a second step, the information is inserted into the corresponding view template.

An updating module 260 receives new data to be inserted into the database 225 from the data-collecting computers; the module 260 controls updating of the database 225 accordingly. The updating module 260 is further provided with a list of dynamic web pages affected by the updating data, which is transmitted to the formatting module 210.

For example, the server computer may store a central database 225 recording information about a sporting event, such as the Olympic games; particularly, the database 225 may then include data about athletes and officials, competition schedules, start lists, records, medals, and results from completed competitions. The data-collecting computers capture all relevant scoring, timing, and statistical information in each venue during the competition. Calculations are performed to generate information about athletes or team standings and records, which information is then sent to the server computer. The queries on the database 225 are used to make consolidated information available to other systems, such as an Olympic games INTRANET or news press agencies.

Similar considerations apply if the programs and data are structured in a different manner, if different modules or functions are provided, if the database, the programs and/or the view templates are stored elsewhere, if the database includes different information, if the programs and the queries are written in another language, if each view template is associated with a set consisting of a different number of programs with a different number of queries, if the data tags are replaced with equivalent instructions, if different identifiers are inserted into the view templates for indicating the associated compiled programs, and so on.

Figure 3:
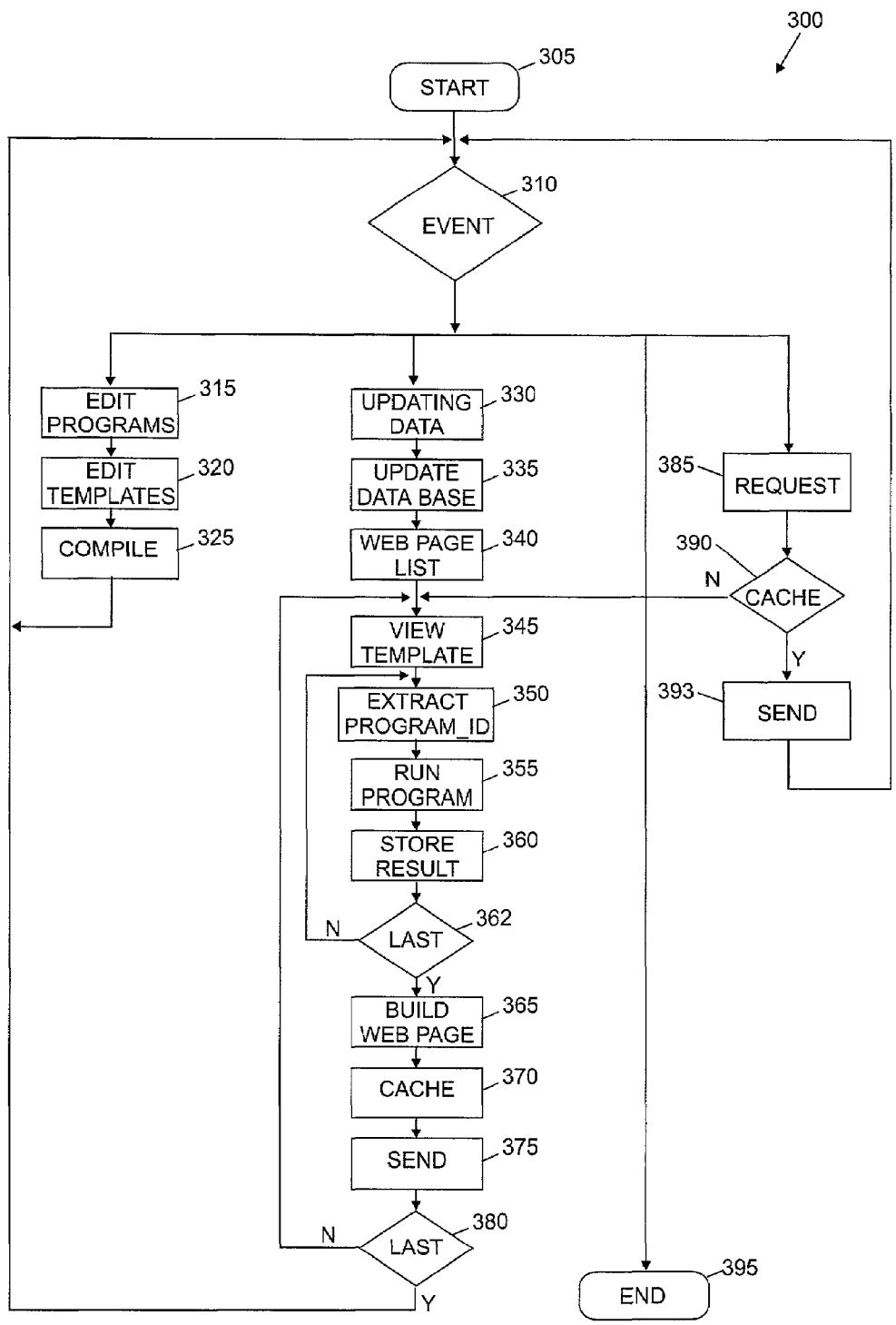
FIG. 3 shows a flow chart describing the logic of a method used for delivering dynamic information.

With reference to FIG. 3, operation of the server computer involves execution of a method 300. It should be noted that the method 300 is described with a flow chart for the sake of simplicity, although it typically involves several concurrent processes that execute different operations in parallel. The method 300 starts at block 305, and then passes to the test block 310. The method carries out the operations corresponding to the event that has occurred. Particularly, if an administration function has been invoked the blocks 315–325 are executed, if updating data has been received from the data-collecting computers for being deployed to different client computers the blocks 330–380 are executed, whereas if a request has been received from a client computer the blocks 385–393 are executed; conversely, if the server computer has been shut down, the method ends at the final block 395.

Considering now block 315 (administration function), a web administrator may insert, update or delete the source programs with their queries to the database. Continuing to block 320, the web administrator is likewise allowed to edit the source templates. The method descends into block 325, wherein the web administrator may choose to compile the source programs and/or the source templates. The method then returns to block 310 waiting for a new event.

With reference to block 330 (deployment function), the updating data are received from a data-collecting computer. The database is updated at block 335 accordingly. Passing now to block 340, the list of dynamic web pages affected by the updating data (received from the data-collecting computer as well) is transmitted to the formatting module.

The method continues to block 345, wherein the formatting module retrieves the compiled template corresponding to a first dynamic web page identified in the list. Moving to block 350, the name of a first associated compiled program embedding queries to be run on the database is extracted from the compiled template. The compiled program is then run at block 355. The method descends into block 360, wherein the query result is stored into the shared memory structure of the server computer. The method checks at block 362 whether a last compiled program has been processed. If not, the method returns to block 350 for repeating the operations described above with a next compiled program (which name is extracted from the compiled template). On the contrary, the corresponding dynamic web page is built at block 365 by executing the instructions of the compiled template, which cause the data tags to be replaced with the associated records stored in the shared memory structure. Proceeding to block 370, the resulting dynamic web page is inserted into the cache memory for the web server module. The web page is then distributed to a pre-set number of client computers at block 375 (for example to all the client computers of the associated INTRANET). The method checks at block 380 whether a last dynamic web page of the list has been processed. If not, the method returns to block 345 for repeating the operations described above on the view template associated with a next dynamic web page; on the contrary, the method returns to block 310 waiting for a new event.

Considering now block 385 (client request function), a request for a dynamic web page is submitted to the server computer from a client computer of the network. The web server verifies at block 390 whether the dynamic web page is available in the cache memory (that is, whether the dynamic web page is stored in an entry of the cache memory that is not flagged as invalid). If so, the dynamic web page is sent to the client computer directly at block 393, and the method then returns to block 310 waiting for a new event. On the contrary, the method passes to block 345 for building and delivering the dynamic web page as described above.

Similar considerations apply if an equivalent method is performed, for example with error routines or statistical functions, if further functionalities are provided, and the like.

More generally, the present invention provides a method of delivering dynamic information in a network. The method includes a series of steps, which are carried out under the control of a server computer of the network. At first, a plurality of view templates (each one for a block of information) and a plurality of sets of one or more programs (each set being for fetching a block of information) are stored. The server computer retrieves the view template corresponding to a selected block of information; the selected block of information is fetched by running the corresponding set of programs. The server computer generates a view structure by combining the selected block of information with the corresponding view template. The view structure is then sent to one or more client computers of the network, in order to cause the view structure to be displayed on the client computers.

The devised solution simplifies the process executed on the server computer for distributing dynamic information in the network. Moreover, fetching of the dynamic information is very fast, since the corresponding programs may be optimised for their specific task. This greatly improves the throughput of the server computer, and then the performance of the network as a whole.

The solution proposed by the present invention is particularly advantageous for high-availability server computers, which are then allowed to distribute complex reports at very high rate.

The preferred embodiment of the invention described above offers further advantages. For example, each view template includes a set of one or more identifiers of the corresponding programs. In this way, the programs for fetching the dynamic information are associated with the corresponding view templates in a very simple manner.

Preferably, each program embeds one or more queries to be run on the database; moreover, the query result is stored into a shared memory structure of the server computer.

The proposed feature makes it very efficient the process of providing the dynamic information (fetched from the database) to the formatting module for their combination with the corresponding view template.

However, the solution of the invention leads itself to implemented even associating each set of programs with the corresponding view template in a different manner (for example with a specific table), or storing the query result elsewhere.

In a particular embodiment of the present invention, each view template includes instructions for inserting the corresponding records of the query result into the view template.

This feature makes the method of the invention quite versatile. Moreover, combination of the dynamic information with the corresponding view template simply requires the execution of the instructions embedded in the view template.

Advantageously, the view templates and the programs are compiled.

This solution speeds up the process of fetching the dynamic information and building the corresponding view structure; as a consequence, the performance of the server computer is further improved.

Alternatively, the dynamic information is combined with the corresponding view template in a different manner, or the view templates and/or the programs are not pre-compiled.

Moreover, the process of distributing the dynamic information is triggered by the receiving of updating data for the information stored on the server computer, together with an indication of view templates affected by the new data. In this way, up-to-date and consolidated information may be deployed at very high-rate.

Preferably, the view structure obtained by combining the query result with the corresponding view template defines a web page.

However, the solution according to the present invention is suitable to be employed even when the dynamic information is requested by a client computer of the network directly, or when the network makes use of different structures to be displayed on the client computers.

Advantageously, the solution according to the present invention is implemented with a computer program, which may be provided on CD-ROM.

Alternatively, the program may be distributed on floppy-disk, pre-loaded onto the hard-disk, or stored on any other computer readable medium, sent to the server computer through the INTERNET, broadcast, or more generally provided in any other form loadable into the working memory of the server computer. However, the method according to the present invention leads itself to be carried out even with a hardware structure, for example integrated in a chip of semiconductor material.

Naturally, in order to satisfy local and specific requirements, a person skilled in the art, once taught the present invention, may apply to the solution described above many modifications and alterations all of which, however, are included within the scope of protection of the invention as defined by the following claims.

What is claimed is:

1. A method of delivering dynamic information in a network including the steps, under the control of a server computer of the network, of:
   storing a plurality of view templates, each one for a block of information, and a plurality of sets of at least one program, each set being for fetching a block of information;
   retrieving a view template corresponding to a selected block of information;
   fetching the selected block of information by running the corresponding set of at least one program;
   generating a view structure by combining the selected block of information with the corresponding view template; and
   sending the view structure to at least one client computer of the network for causing the view structure to be displayed on the at least one client computer,
   wherein the corresponding view template is generated by a compiler and has the form of a directly executable program.

2. The method according to claim 1, wherein each view template includes at least one identifier of the corresponding at least one program; and the step of fetching the selected block of information further includes the steps of extracting each identifier from the corresponding view template and running the program associated with the identifier.

3. The method according to claim 1, wherein the set of at least one program includes at least one query for extracting the corresponding block of information from a database stored on the server computer; and the step of fetching the selected block of information further includes the steps of running the corresponding at least one query, and storing records resulting from the at least one query into a shared memory structure of the server computer.

4. The method according to claim 3, wherein each view template includes a plurality of instructions for inserting the corresponding records into the view template; and the step of generating the view structure further includes the step of executing the instructions of the corresponding view template.

5. The method according to claim 4, further including the step of compiling the view templates and the programs.

6. The method according to claim 1, further including the steps of:
   receiving updating data and an indication of the view templates associated with the updating data;
   updating information stored on the server computer according to the updating data;
   generating the view structures corresponding to the view templates associated with the updating data; and
   sending the view structures to the at least one client computer.

7. The method according to claim 1, wherein the view structure defines a web page.

8. A computer program application directly loadable into a working memory of a server computer of a network for performing a method of delivering dynamic information in the network when the application is run on the server computer, the server computer storing a plurality of view templates, each one for a block of information, and a plurality of sets of at least one program, each set being for fetching a block of information, wherein the method includes the steps of:
   retrieving the view template corresponding to a selected block of information;
   fetching the selected block of information by running the corresponding set of at least one program;
   generating a view structure by combining the selected block of information with the corresponding view template; and
   sending the view structure to at least one client computer of the network for causing the view structure to be displayed on the at least one client computer,
   wherein the corresponding view template is generated by a compiler and has the form of a directly executable program.

9. A program product comprising a computer readable medium on which the program application of claim 8 is stored.

10. A system for delivering dynamic information in a network, including a server computer having means for storing a plurality of view templates, each one for a block of information, and a plurality of sets of at least one program, each set being for fetching a block of information; means for retrieving a view template corresponding to a selected block of information; means for fetching the selected block of information by running the corresponding set of at least one program; means for generating a view structure by combining the selected block of information with the corresponding view template; and means for sending the view structure to at least one client computer of the network for causing the view structure to be displayed on the at least one client computer, wherein the corresponding view template is generated by a compiler and has the form of a directly executable program.

11. A system for delivering dynamic information in a network, including a server computer having a memory for storing a plurality of view templates, each one for a block of information, and a plurality of sets of at least one program, each set being for fetching a block of information; a software module for retrieving the view template corresponding to a selected block of information; a software module for fetching the selected block of information by running the corresponding set of at least one program; a software module for generating a view structure by combining the selected block of information with the corresponding view template; and a software module for sending the view structure to at least one client computer of the network for causing the view structure to be displayed on the at least one client computer, wherein the corresponding view template is generated by a compiler and has the form of a directly executable program.

12. A system for delivering dynamic information in a network, including a server computer having a memory for storing a plurality of view templates, each one for a block of information, and a plurality of sets of at least one program, each set being for fetching a block of information; a formatting module for retrieving a view template corresponding to a selected block of information, for fetching the selected block of information by running the corresponding set of at least one program, and for generating a dynamic web page by combining the selected block of information with the corresponding view template; and a web server module for sending the dynamic web page to at least one client computer of the network for causing the dynamic web page to be displayed on the at least one client computer, wherein the corresponding view template is generated by a compiler and has the form of a directly executable program.

* * * * *